US008911004B2

(12) United States Patent
Yao

(10) Patent No.: US 8,911,004 B2
(45) Date of Patent: Dec. 16, 2014

(54) VEHICULAR CENTER PILLAR AND VEHICLE

(75) Inventor: Takashi Yao, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/510,818

(22) PCT Filed: Apr. 12, 2011

(86) PCT No.: PCT/IB2011/000811
§ 371 (c)(1),
(2), (4) Date: May 18, 2012

(87) PCT Pub. No.: WO2011/128759
PCT Pub. Date: Oct. 20, 2011

(65) Prior Publication Data
US 2013/0020833 A1    Jan. 24, 2013

(30) Foreign Application Priority Data

Apr. 13, 2010    (JP) .................................. 2010-091975

(51) Int. Cl.
*B62D 25/04*    (2006.01)
(52) U.S. Cl.
CPC ..................................... *B62D 25/04* (2013.01)
USPC ............. 296/193.06; 296/203.03; 296/187.13
(58) Field of Classification Search
USPC ............. 296/193.06, 203.03, 203.01, 187.03, 296/187.13
See application file for complete search history.

(56) References Cited

U.S. PATENT DOCUMENTS

| 4,470,619 | A   | * | 9/1984  | Imajyo et al.  | 280/808   |
|-----------|-----|---|---------|----------------|-----------|
| 4,763,925 | A   | * | 8/1988  | Onoe et al.    | 280/808   |
| 5,782,491 | A   |   | 7/1998  | Patel          |           |
| 5,836,613 | A   | * | 11/1998 | Saito et al.   | 280/808   |
| 6,302,477 | B1  | * | 10/2001 | Satou          | 296/187.05|
| 6,364,359 | B1  |   | 4/2002  | Dietrich       |           |
| 6,854,767 | B2  | * | 2/2005  | Yakata et al.  | 280/808   |
| 7,152,914 | B2  | * | 12/2006 | Dingman et al. | 296/193.05|
| 7,510,234 | B2  | * | 3/2009  | Ameloot et al. | 296/187.12|
| 7,959,217 | B2  | * | 6/2011  | Onuma          | 296/187.12|
| 8,033,595 | B2  | * | 10/2011 | Orii           | 296/190.08|

(Continued)

FOREIGN PATENT DOCUMENTS

| CN | 1836956 A    | 9/2006 |
|----|--------------|--------|
| DE | 200 05 145 U1| 9/2000 |

(Continued)

OTHER PUBLICATIONS

Jun. 26, 2012 Japanese Office Action issued in Japanese Patent Application No. 2010-091975 (with translation).

(Continued)

*Primary Examiner* — Dennis H Pedder
(74) *Attorney, Agent, or Firm* — Oliff PLC

(57) ABSTRACT

A vehicular center pillar with improved proof stress against loads input from above a vehicle includes a pillar body that extends in a vertical direction of the vehicle and has flanges, formed on the front and rear sides of the pillar body, that extend in a longitudinal direction of the vehicle, and a reinforcing member that connects the front flange to the rear flange. The reinforcing member includes a predetermined connection portion that rectilinearly connects the front flange to the rear flange in the longitudinal direction.

9 Claims, 11 Drawing Sheets

(56) References Cited

U.S. PATENT DOCUMENTS

| | | |
|---|---|---|
| 2002/0033618 A1* | 3/2002 | Kwon .................. 296/203.03 |
| 2006/0208537 A1 | 9/2006 | Dingman et al. |
| 2008/0106123 A1 | 5/2008 | Lakic |
| 2008/0143144 A1 | 6/2008 | Yustick et al. |

FOREIGN PATENT DOCUMENTS

| | | |
|---|---|---|
| DE | 100 11 906 C1 | 8/2001 |
| DE | 101 62 741 A1 | 7/2003 |
| JP | U-57-77085 | 10/1955 |
| JP | A-04-038276 | 2/1992 |
| JP | A-9-175429 | 7/1997 |
| JP | A-9-254811 | 9/1997 |
| JP | A-9-254825 | 9/1997 |
| JP | A-2001-328560 | 11/2001 |
| JP | A-2002-331959 | 11/2002 |
| JP | A-2006-273145 | 10/2006 |
| JP | A-2009-262614 | 11/2009 |
| JP | A-2010-254130 | 11/2010 |

OTHER PUBLICATIONS

Written Opinion of the International Searching Authority issued in Application No. PCT/IB2011/000811; Dated Aug. 4, 2011.

International Search Report issued in Application No. PCT/IB2011/000811; Dated Aug. 4, 2011.

* cited by examiner

I-I CROSS-SECTION

V - V CROSS-SECTION

V – V

THICKNESS DIRECTION

OUTWARD
BACKWARD

I-I CROSS-SECTION

C-C

VEHICULAR CENTER PILLAR AND VEHICLE

BACKGROUND OF THE INVENTION

1. Field of the Invention

The invention relates to a vehicular center pillar and a vehicle equipped with the vehicular center pillar.

2. Description of the Related Art

There is known an art for a vehicular pillar equipped with a reinforcing member. For example, Japanese Patent Application Publication No, 2002-331959 (JP-A-2002-331959) describes an art for a rear vehicle body structure of a vehicle equipped with a quarter pillar formed in a hollow closed cross-sectional shape and a pillar reinforcement provided in the quarter pillar.

In this case, there is still a room to study the possibility of enhancing the proof stress against loads input to the center pillar. For example, the concept of enhancing the proof stress against loads input to the center pillar from above the vehicle (e.g., from diagonally above the vehicle) has not so far been studied sufficiently.

SUMMARY OF THE INVENTION

The invention provides a vehicular center pillar with enhanced proof stress for a load input from above a vehicle, and a vehicle equipped with the vehicular center pillar.

A vehicular center pillar according to a first aspect of the invention is equipped with a pillar body that extends in a vertical direction of a vehicle and has flanges on front and rear sides thereof in a longitudinal direction of the vehicle respectively, and a reinforcing member that connects the front flange and the rear flange to each other. The reinforcing member has a predetermined connection portion that rectilinearly connects the front flange and the rear flange to each other in the longitudinal direction.

Further, in the aforementioned vehicular center pillar, the predetermined connection portion may be arranged above a lower end of a window frame adjacent to the pillar body in the vertical direction.

Further, in the aforementioned vehicular center pillar, the reinforcing member may have a protrusion protruding in a vehicle width direction of the vehicle at a position different from the predetermined connection portion in the vertical direction.

Further, in the aforementioned vehicular center pillar, the reinforcing member may have a seatbelt anchor fixed thereto and have a protrusion protruding in a vehicle width direction of the vehicle at a position different from the predetermined connection portion in the vertical direction, and the seatbelt anchor may be coupled to the reinforcing member at the protrusion.

Further, in the aforementioned vehicular center pillar, the reinforcing member may be joined to the front flange and the rear flange at a plurality of joint points along the vertical direction respectively, and at least one of the joint points may be set at the predetermined connection portion.

Further, the predetermined connection portion may be formed at a lower end portion of the reinforcing member.

Further, the predetermined connection portion may be formed at a location where a cross-sectional area of a hollow portion of the center pillar that has remained substantially constant along the vertical direction begins to change.

Further, the predetermined connection portion may be formed at a location where an inclination of the center pillar in a vehicle width direction changes.

The vehicular center pillar according to the first aspect of the invention is equipped with the pillar body that extends in the vertical direction of the vehicle and has the flanges on the front and rear sides thereof in the longitudinal direction of the vehicle respectively, and the reinforcing member that connects the front flange and the rear flange to each other. The reinforcing member has the predetermined connection portion that rectilinearly connects the front flange and the rear flange to each other in the longitudinal direction. Thus, the center pillar is restrained from being elastically deformed when a load is input thereto from above the vehicle. Therefore, the vehicular center pillar according to the first aspect of the invention achieves an effect of making it possible to enhance the proof stress of the center pillar when a load is input thereto from above the vehicle.

A vehicle according to a second aspect of the invention is equipped with the center pillar according to the first aspect of the invention.

The vehicle according to the second aspect of the invention achieves an effect of making it possible to enhance the proof stress of the center pillar when a load is input thereto from above the vehicle.

BRIEF DESCRIPTION OF THE DRAWINGS

The foregoing and further features and advantages of the invention will become apparent from the following description of an example embodiment of the invention with reference to the accompanying drawings, wherein like numerals are used to represent like elements, and wherein.

DETAILED DESCRIPTION OF EMBODIMENT

One embodiment of a vehicular center pillar according to the invention is described below with reference to the drawings. It should be noted that the invention is not limited by this embodiment thereof.

Figure 1:
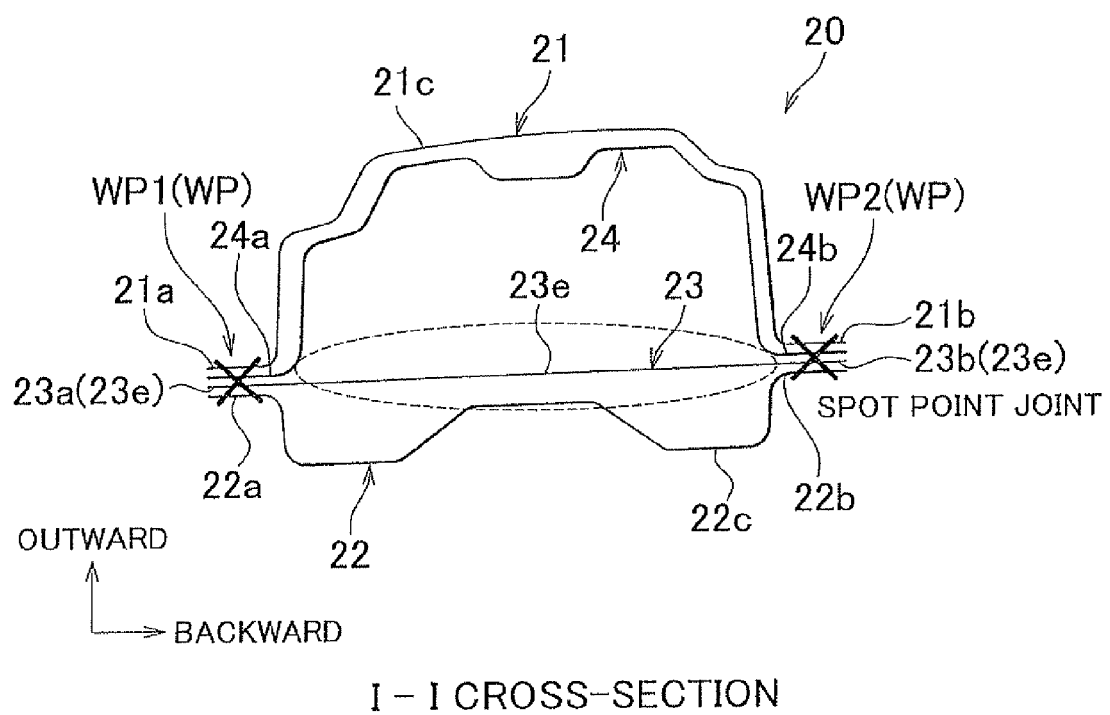
FIG. 1 shows the cross-section of a vehicular center pillar according to the embodiment of the invention.
Figure 2:
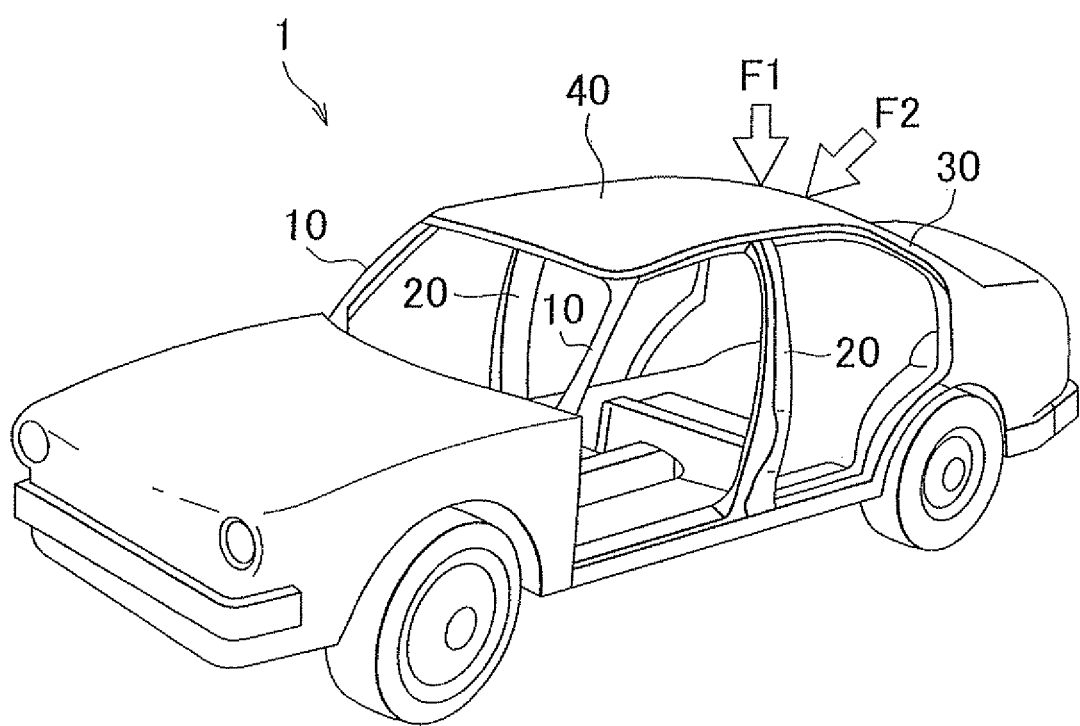
FIG. 2 shows the overall construction of a vehicle according to the embodiment of the invention.
Figure 4:
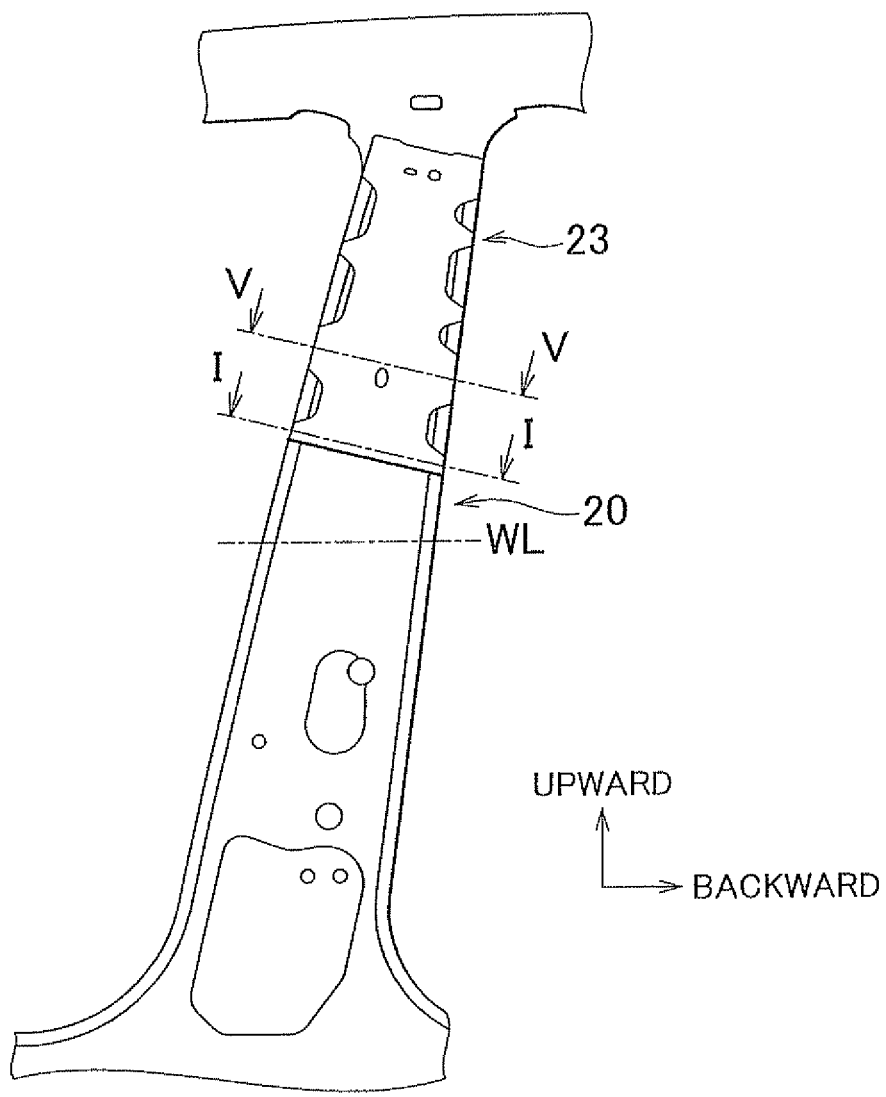
FIG. 4 is a perspective view of the center pillar.
Figure 5:
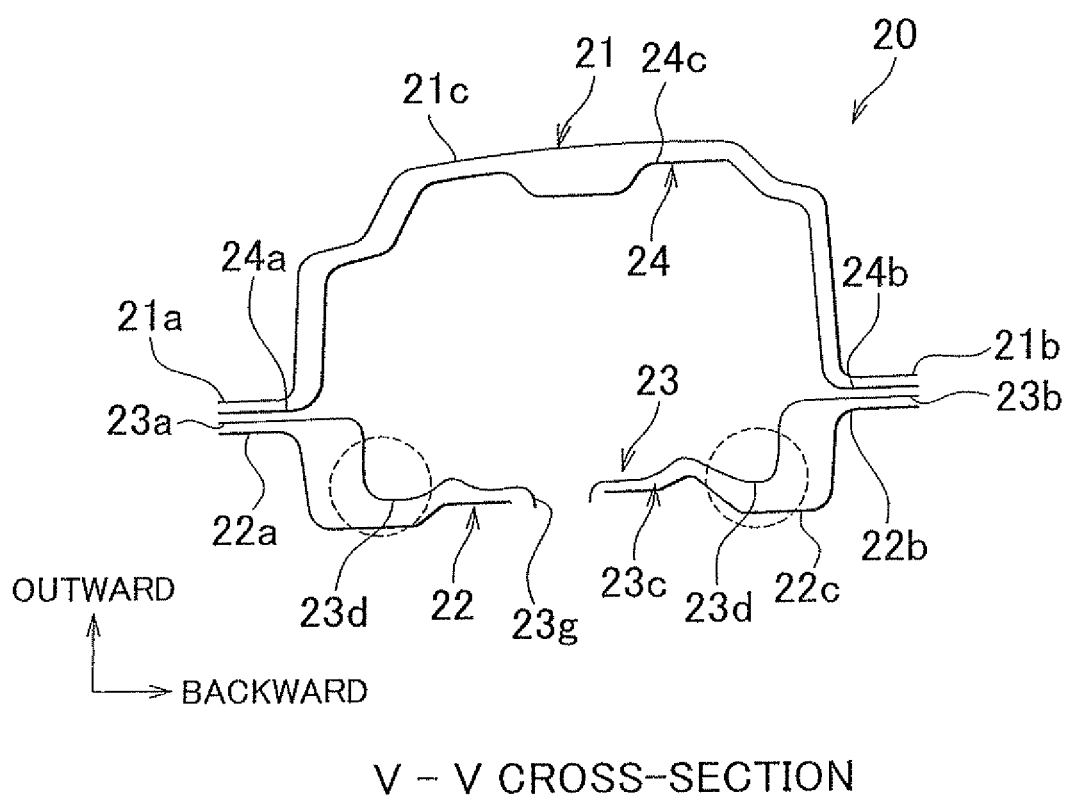
FIG. 5 is another view of the cross-section of the vehicular center pillar according to the embodiment of the invention.

The embodiment of the invention relates to a vehicular center pillar and will be described with reference to FIGS. 1 to 10. FIG. 1 shows a cross-section of the vehicular center pillar according to the embodiment of the invention. FIG. 2 shows the overall construction of a vehicle according to the embodiment of the invention. FIG. 5 also shows the cross-section of the vehicular center pillar according to the embodiment of the invention.

The vehicular center pillar according to this embodiment includes a belt anchor reinforcement that ensures strength for an input from above or from diagonally above. The belt anchor reinforcement is arranged within a cross-section of the center pillar above the pillar beltline. The belt anchor reinforcement is formed and arranged with good mass efficiency for a deformation resistance. More specifically, the belt anchor reinforcement has a predetermined connection portion that rectilinearly connects a front flange to a rear flange on the body of the center pillar. The predetermined connection portion restrains the cross-sectional shape of the center pillar from collapsing (being deformed). The proof stress against loads input to the center pillar from above the vehicle may thereby be enhanced.

In FIG. 2, the vehicle is denoted by a reference symbol 1. The vehicle 1 includes a front pillar 10, a center pillar 20, and a rear pillar 30. A roof panel 40 is supported by the front pillar 10, the center pillar 20, and the rear pillar 30. The center pillar 20 extends in a vertical direction of the vehicle 1.

Figure 3:
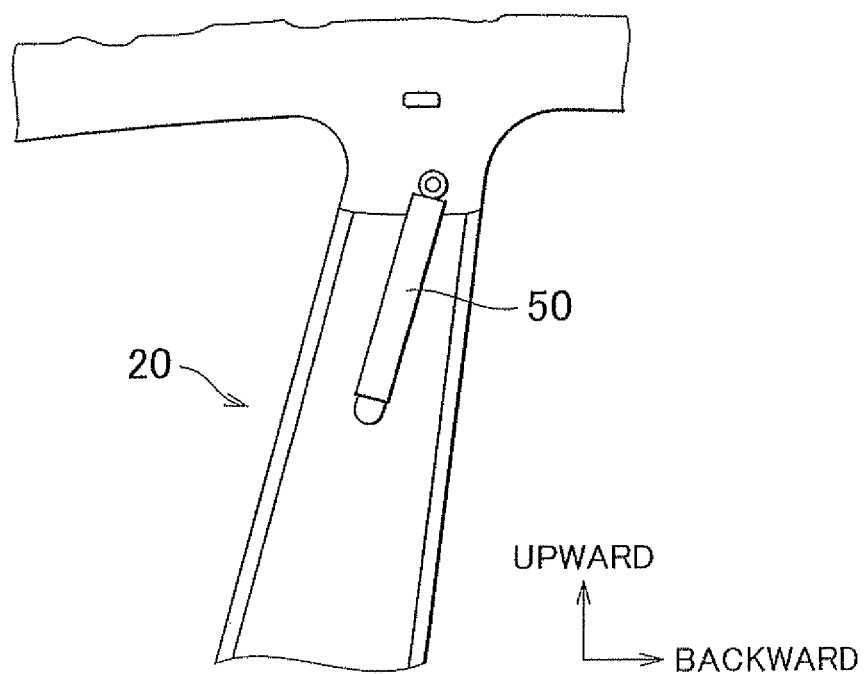
FIG. 3 is a view of the center pillar from inside the vehicle.

FIG. 3 is a view of the center pillar 20 from inside the vehicle 1. That is, FIG. 3 shows the center pillar 20 on the inside of a vehicle compartment. Further, FIG. 4 is a perspective view of the center pillar 20. In the following description, the inside of the vehicle in a vehicle width direction is referred to simply as "inside", and the outside of the vehicle in the vehicle width direction is referred to simply as "outside". Further, the upper side in the vertical direction of the vehicle 1 is referred to simply as "upper side", and the lower side in the vertical direction of the vehicle 1 is referred to simply as "lower side". Further, the front side in a longitudinal direction of the vehicle 1 is referred to simply as "front side", and the rear side in the longitudinal direction of the vehicle 1 is referred to simply as "rear side". A belt anchor (seatbelt anchor) 50 is arranged on the inside of the center pillar 20. The belt anchor 50 supports a split joint of a seatbelt.

Figure 6:
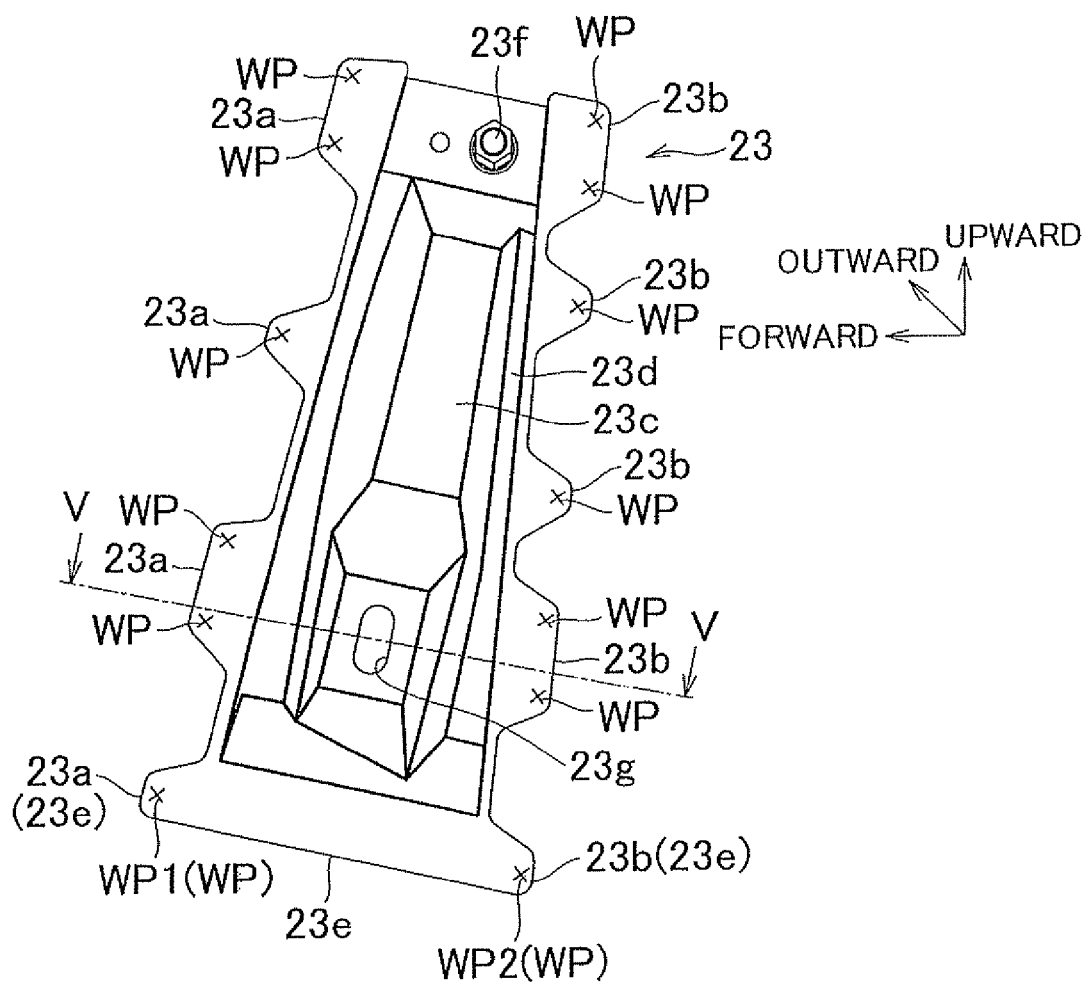
FIG. 6 is composed of a plan view and a cross-sectional view that show a belt anchor reinforcement.
Figure 6:
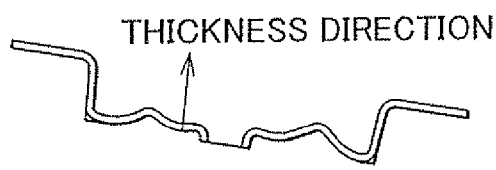
Figure 7:
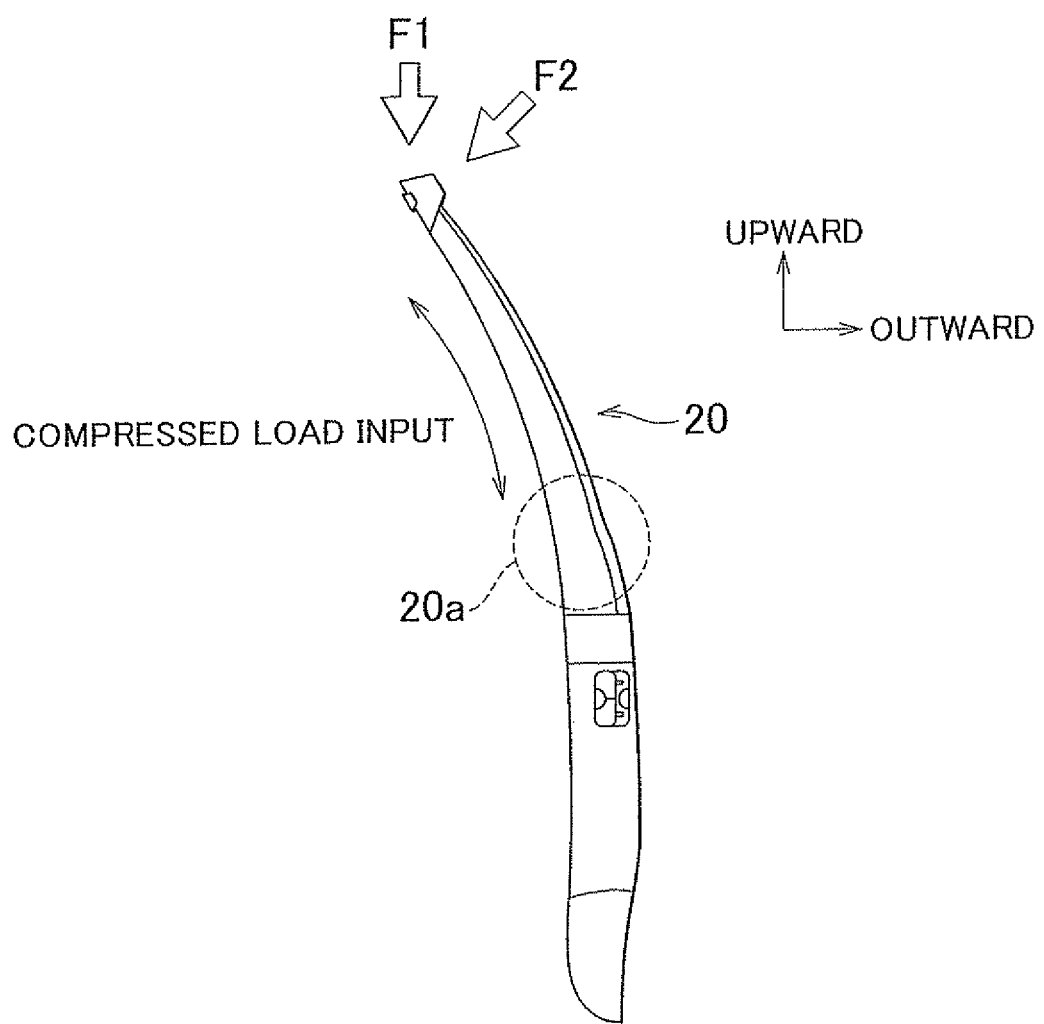
FIG. 7 is a lateral view of the center pillar.

In FIG. 4, the belt anchor reinforcement is denoted by reference number 23. The belt anchor 50 is joined and fixed to the belt anchor reinforcement 23. FIG. 5 shows the cross-section of the center pillar along the line V-V in FIG. 4. FIG. 1 shows the cross-section of the center pillar along the line I-I in FIG. 4. FIG. 6 is a plan view and a cross-sectional view of the belt anchor reinforcement 23. Further, FIG. 7 is a lateral view of the center pillar 20. The cross-section along the line V-V of the belt anchor reinforcement 23 is shown in FIGS. 5 and 6. As shown in FIGS. 1 and 5, the center pillar 20 has an outer center pillar 21, an inner center pillar 22, the belt anchor reinforcement 23, and an outer reinforcement 24.

The outer center pillar 21 and the inner center pillar 22 constitute the pillar body of the center pillar 20. The outer center pillar 21 and the inner center pillar 22 extend in the vertical direction of the vehicle 1. Flanges are provided on the front and rear sides of the outer center pillar 21. A first protrusion 21c that protrudes outward is formed between an outer front flange 21a, which is provided on the front side, and an outer rear flange 21b, which is provided on the rear side. In a direction perpendicular to a direction in which the center pillar 20 extends, the outer center pillar 21 assumes a hat-like cross-sectional shape protruding outward.

Flanges are provided on the front and rear sides of the inner center pillar 22. A second protrusion 22c that protrudes inward is formed between an inner front flange 22a, which is provided on the front side, and an inner rear flange 22b, which is provided on the rear side. In the direction perpendicular to the direction in which the center pillar 20 extends, the inner center pillar 22 assumes a hat-like cross-sectional shape protruding inward.

The belt anchor reinforcement 23 is a reinforcing member that connects the front flanges to the rear flanges on the pillar body. As shown in FIGS. 1 and 5, flanges are provided on the front and rear sides of the belt anchor reinforcement 23. A front flange anchor 23a is provided on the front side, between the outer front flange 21a and the inner front flange 22a. Further, a rear flange anchor 23a is provided on the rear side, between the outer rear flange 21b and the inner rear flange 22a.

As shown in FIG. 5, a third protrusion 23c protrudes in the vehicle width direction and is formed on the belt anchor reinforcement 23. The third protrusion 23c protrudes inward from the front flange anchor 23a and the rear flange anchor 23b. Ridge line portions 23d are formed at front and rear ends of the third protrusion 23c. The ridge line portions 23d are formed like vertically extending ridge lines (crests). The ridge line portions 23d assume a generally U-shaped cross-section, and are convex toward the inside of the vehicle. The proof stress of the center pillar 20 is increased due to the formation of the third protrusion 23c and the ridge line portions 23d on the belt anchor reinforcement 23. It should be noted that the belt anchor reinforcement 23 may have a protrusion that protrudes outward from the front flange anchor 23a and the rear flange anchor 23b.

The outer reinforcement 24 functions as a reinforcing member that connects the front flanges to the rear flanges on the pillar body. Flanges are provided on the front and rear sides of the outer reinforcement 24. A fourth protrusion 24c that protrudes outward of the vehicle is formed between a reinforcement front flange portion 24a, which is provided on the front side, and a reinforcement rear flange portion 24b, which is provided on the rear side. That is, in the direction perpendicular to the direction in which the center pillar 20 extends, the outer reinforce 24 assumes a hat-like cross-sectional shape protruding outward.

The respective flanges are perpendicular to the vehicle width direction and parallel to one another. That is, the outer front flange 21a, the inner front flange 22a, the front flange anchor 23a, and the reinforcement front flange portion 24a are perpendicular to the vehicle width direction respectively and opposed to one another in the vehicle width direction. Further, the outer rear flange 21b, the inner rear flange 22b, the rear flange anchor 23b, and the reinforcement rear flange portion 24b are each perpendicular to the vehicle width direction and opposed to one another in the vehicle width direction.

As shown in FIG. 5, the first protrusion 21c of the outer center pillar 21 and the fourth protrusion 24c of the outer reinforcement 24 are substantially parallel to each other. Further, the second protrusion 22c of the inner center pillar 22 is substantially parallel with the third protrusion 23c of the belt anchor reinforcement 23. That is, the protrusion states of the second protrusion 22c and the third protrusion 23e correspond to each other in the vehicle width direction. In a region where the second protrusion 22c curves inward convexly, the third protrusion 23c is correspondingly curved inward. Where the second protrusion 22c is curved outward, the third protrusion 23c is correspondingly curved outward.

Further, the first protrusion 21c of the outer center pillar 21 and the second protrusion 22c of the inner center pillar 22 are opposed to each other in the vehicle width direction. That is, the first protrusion 21c and the second protrusion 22c are perpendicular to a direction in which a lateral load is applied.

The strength of the center pillar 20 against an input from above or from diagonally above the center pillar 20 is enhanced. When a load (F1) is input from above the center pillar 20 or a load (F2) is input from diagonally above the center pillar 20 as shown in FIGS. 2 and 7, a compressive load is applied to the inside of the center pillar 20 as shown in FIG. 7. In this embodiment of the invention, because the third protrusion 23c and the ridge line portion 23d are formed on the belt anchor reinforcement 23, the strength of the center pillar 20 against loads input thereto is enhanced. Further, the belt anchor reinforcement 23 is designed as an integral member instead of being divided into a plurality of members. Therefore, the strength of the center pillar 20 is enhanced against loads input to the center pillar.

The arrangement of the ridge line portion 23d on a compressive input side (on the inside) for, an input from above or from diagonally above the center pillar 20 effectively enhances proof stress. However, the actual proof stress in a vehicle inward tumbling direction decreases due to the occurrence of elastic deformation near the beltline (see a reference symbol 20a in FIG. 7) of the center pillar 20 during the initial stages of deformation. It should be noted herein that the beltline is located at the lower end of a window frame (not shown) of the vehicle 1. In the vehicle 1, a door is arranged adjacent to the center pillar 20. The beltline is located at the lower end of a window frame formed in the door.

Figure 8:
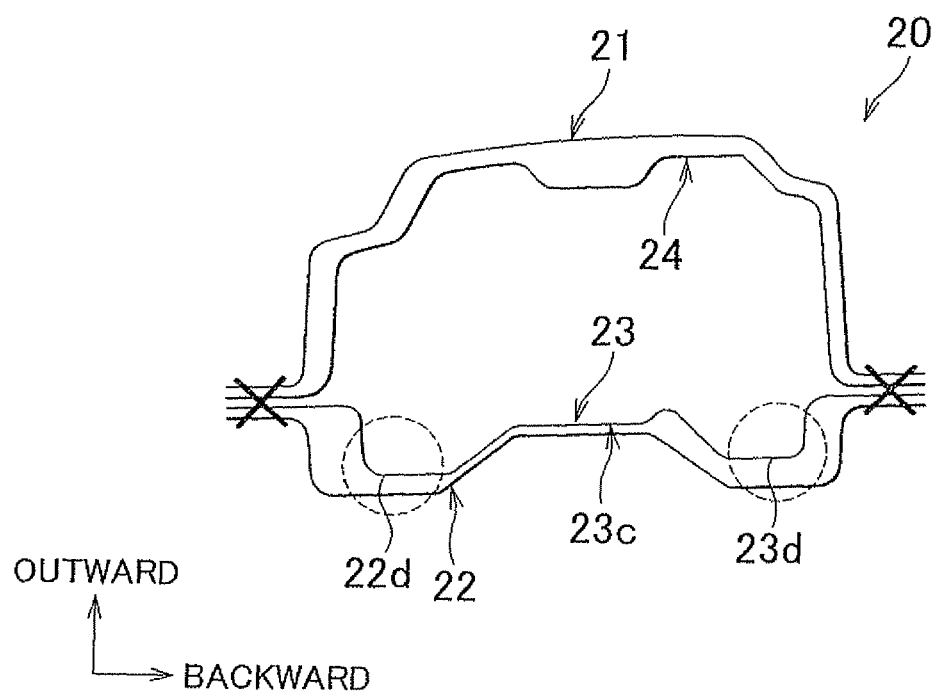
FIG. 8 is a view showing an example of a shape of the belt anchor reinforcement.

As shown in FIG. 7, if the center pillar 20 has a shape curved outward convexly along the vertical direction, a compressive load is input to the inside due to a load input from above or from diagonally above the center pillar 20. Elastic deformation occurs near the beltline on the center pillar 20 during the initial stages of deformation resulting from this load. If the lower end of the belt anchor reinforcement 23 is shaped with the third protrusion 23c and the ridge line portion 23d as shown in FIG. 8, this elastic deformation is unlikely to be suppressed. FIG. 8 shows the shape of the belt anchor reinforcement 23 as viewed in the cross-section taken along the line I-I in FIG. 4. As shown in FIG. 8, the third protrusion 23c and the ridge line portion 23d may extend as far as the lower end of the belt anchor reinforce 23 to enhance the proof stress of the center pillar 20. In this case, however, as described below with reference to FIG. 9, the actual proof stress of the center pillar 20 in the vehicle inward tumbling direction tends to decrease.

Figure 9:
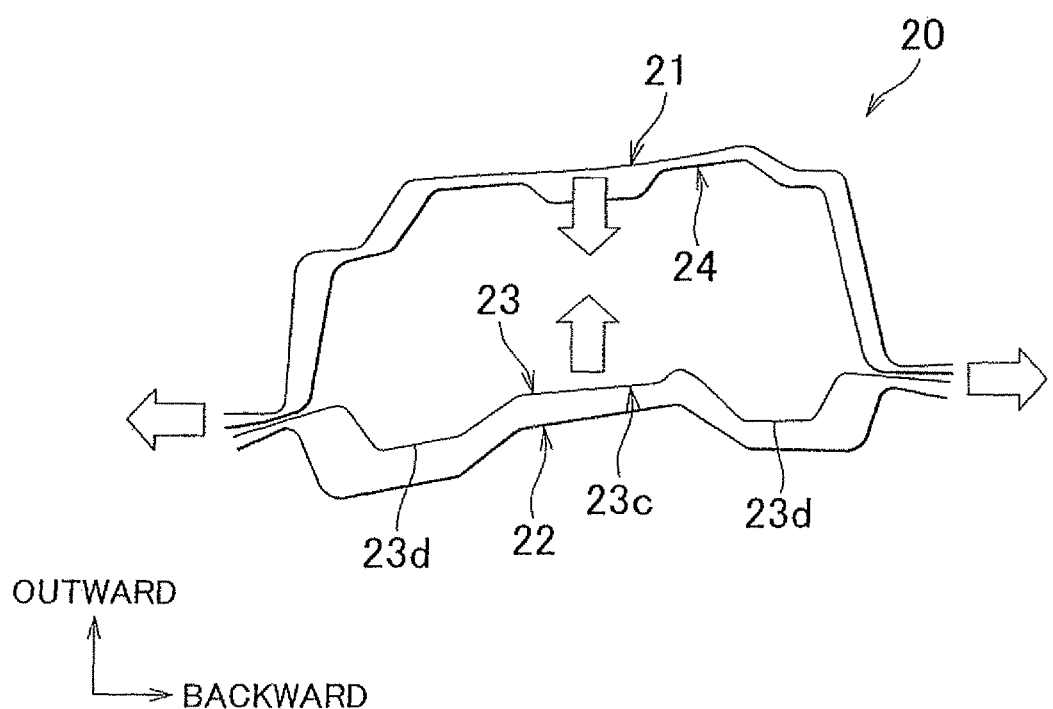
FIG. 9 is a view showing an example of deformation of the center pillar resulting from a load input thereto.

FIG. 9 shows an example of the deformation of the center pillar 20 resulting from a load input thereto. When the vicinity of the beltline of the center pillar 20 is elastically deformed due to a load input from above or from diagonally above the center pillar 20, the cross-section of the center pillar 20 becomes reduced in size in a vehicle lateral direction (the vehicle width direction), and the center pillar 20 is so deformed as to extend in the longitudinal direction. That is, the center pillar 20 is deformed as in the case of being pulled in the longitudinal direction. If an attempt is made to suppress this deformation with the belt anchor reinforcement 23 formed in a shape with the third protrusion 23c and the ridge line portion 23d, an increase in thickness and the like are required, so an increase in mass is entailed.

In the center pillar 20 according to this embodiment of the invention, as shown in FIG. 1, the belt anchor reinforcement 23 has a predetermined connection portion 23e that has a substantially rectilinear cross-sectional shape. The predetermined connection portion 23e is formed at a position different from the third protrusion 23c and the ridge line portion 23d in the vertical direction of the vehicle 1. In the longitudinal direction of the vehicle, the predetermined connection portion 23e rectilinearly connects the outer front flange 21a and the inner front flange 22a to the outer rear flange 21b and the inner rear flange 22b respectively. The expression "rectilinearly connects" means that the predetermined connection portion 23e extends along a virtual straight line joining the front flange anchor 23a to the rear flange anchor 23b. Preferably, the predetermined connection portion 23e is not curved in the vehicle width direction (inward or outward) with respect to this virtual line. For example, it is preferable that a centerline of the predetermined connection portion 23e in the vehicle width direction coincide with the aforementioned virtual line.

The predetermined connection portion 23e has a substantially rectilinear cross-sectional shape in the direction perpendicular to the vertical direction in which the outer center pillar 21 and the inner center pillar 22, which constitute the pillar body of the center pillar 20, extend. It should be noted herein that "substantially rectilinear cross-sectional shape" means, for example, that the thickness in the vehicle width direction is constant. It should be noted that the predetermined connection portion 23e may not assume a rectilinear cross-sectional shape. For example, the thickness of the predetermined connection portion 23e in the vehicle width direction may change along the longitudinal direction.

Figure 10:
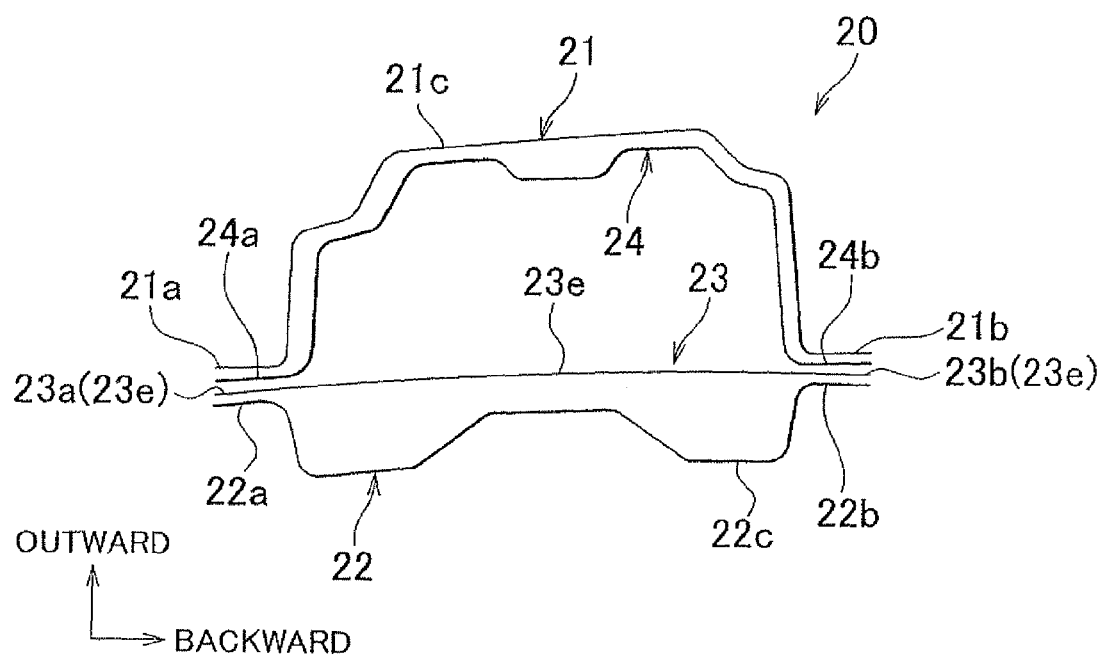
FIG. 10 is a view showing deformation of the center pillar according to the embodiment of the invention resulting from a load input thereto.

The predetermined connection portion 23e rectilinearly extends in the longitudinal direction, and therefore has a higher deformation resistance against longitudinal tension than the region where the third protrusion 23c and the ridge line portion 23d are formed. Accordingly, because the predetermined connection portion 23e is provided on the belt anchor reinforcement 23, the center pillar 20 is restrained from extending in the longitudinal direction. FIG. 10 shows the deformation of the center pillar 20 according to this embodiment of the invention resulting from a load input thereto. The predetermined connection portion 23e demonstrates high deformation resistance against tension in the longitudinal direction. Therefore, when a load is input from above or from diagonally above the center pillar 20, the center pillar 20 is restrained from being so deformed as to become reduced in cross-sectional size in the vehicle lateral direction or extend in the longitudinal direction. By suppressing elastic deformation during the initial stages of deformation in this manner, the actual proof stress of the center pillar 20 in the vehicle inward tumbling direction is increased. Therefore, according to the center pillar 20 of this embodiment of the invention, the actual proof stress of the center pillar 20 in the vehicle inward tumbling direction is increased without causing an increase in production cost or mass of the center pillar.

Further, in this embodiment of the invention, the predetermined connection portion 23e is formed at the lower end of the belt anchor reinforcement 23, specifically, at a position of the belt anchor reinforcement 23 closest to the beltline. In FIG. 4, the beltline is denoted by a reference symbol WL. The belt anchor reinforcement 23 is arranged on the center pillar 20 above the beltline WL, and the predetermined connection portion 23e is formed at the lower end (in an I-I cross-sectional region). Thus, the degree of elastic deformation of the center pillar 20 near the beltline WL during the initial stages of deformation is effectively reduced.

The belt anchor reinforcement 23 according to this embodiment of the invention is joined to the outer center pillar 21 and the inner center pillar 22, which constitute the pillar body of the center pillar 20, at a plurality of joint points along the vertical direction. In FIG. 6, the joint points are denoted by the reference symbol WP. The joint points WP are arranged at the respective front flange anchor 23a and the respective rear flange anchor 23b. At each of the joint points WP, the front flange anchor 23a of the belt anchor reinforcement 23 is joined to the outer front flange 21a, the inner front flange 22a, and the reinforcement front flange portion 24a through spot welding or the like. Further, at each of the joint points WP, the rear flange anchor 23b is joined to the outer rear flange 21b, the inner rear flange 22b, and the reinforcement rear flange portion 24b through spot welding or the like. It should be noted that the joining method at the joint points WP is not limited to spot welding. The flange portions of the belt anchor reinforcement 23 may be joined to the flanges of the pillar body through other joining methods.

Mounting holes 23f and 23g are formed through the third protrusion 23c of the belt anchor reinforcement 23. The third protrusion 23c protrudes toward the inner center pillar 22 and is formed on the belt anchor reinforcement 23 at least at locations where the mounting holes 23f and 23g are formed. The third protrusion 23c abuts against the second protrusion 22c of the inner center pillar 22.

The mounting holes 23f and 23g are through-holes penetrating the belt anchor reinforcement 23 in the vehicle width direction. The belt anchor 50 is fastened through these two mounting holes 23f and 23g by bolts and thereby fixed to the belt anchor reinforcement 23. The mounting hole 23f is formed through the upper portion of the belt anchor reinforcement 23, and the mounting hole 23g is formed through the lower portion of the belt anchor reinforcement 23. An upper portion of the belt anchor 50 is coupled to the mounting hole 23f, and a lower portion of the belt anchor 50 is coupled to the mounting hole 23g. Through-holes corresponding to the mounting holes 23f and 23g are formed in the belt anchor 50 and the inner center pillar 22 respectively. The belt anchor 50 and the belt anchor reinforcement 23, which sandwich the inner center pillar 22, are fastened together with nuts fastened onto bolts inserted in these through-holes and the mounting hole 23f or the mounting hole 23g, so the belt anchor 50 is fixed to the center pillar 20.

In this embodiment of the invention, the predetermined connection portion 23e as an opening flange is formed through a lower portion of the belt anchor reinforcement 23. The predetermined connection portion 23e includes the front flange anchor 23a and the rear flange anchor 23b. The joint points WP (WP1, WP2) are set on the front flange anchor 23a and the rear flange anchor 23b of the predetermined connection portion 23e respectively. The joint points WP are spot points for spot welding. In this manner, the spot points WP1 and WP2 are rectilinearly coupled to each other by the predetermined connection portion 23e, thereby enhancing deformation resistance of the center pillar 20 against tensile loads in the longitudinal direction. Thus, the degree of elastic deformation of the center pillar 20 near the beltline WL during the initial stages of deformation is effectively reduced in comparison with the case where the joint points WP are not set on the front flange anchor 23a and the rear flange anchor 23b of the predetermined connection portion 23e.

It should be noted that although a single predetermined connection portion 23e is formed on the belt anchor reinforcement 23 in this embodiment of the invention, the invention is not limited to this configuration, and that the belt anchor reinforcement 23 may have a plurality of predetermined connection portions 23e.

Although only some WP (WP1, WP2) of the joint points WP are set on the predetermined connection portion 23e, the invention is not limited to this configuration. All the joint points WP may be set on the predetermined connection portion 23e. In other words, it is appropriate that at least one or some of the joint points WP be set on the predetermined connection portion 23e. For example, flat predetermined connection portions 23e may be formed at the upper and lower ends, respectively, of the belt anchor reinforcement 23 and the protrusion 23c and ridge line portion 23d may be provided on the belt anchor reinforcement 23 at an intermediate portion in the vertical direction. In this case, the joint points WP may be set only on the predetermined connection portion 23e.

To suppress elastic deformation of the center pillar 20 near the beltline WL, the predetermined connection portion 23e may be located near the beltline WL. Further, the predetermined connection portion 23e may be provided where the center pillar 20 is likely to be elastically deformed by an impact from above or diagonally above. For example, the predetermined connection portion 23e may be provided at a location where the cross-sectional area of the center pillar 20 (the cross-sectional area of a hollow portion) that has remained substantially constant along the vertical direction begins to increase or decrease. Further, the predetermined connection portion 23e may be provided at a location where the inclination of the center pillar 20 in the vehicle width direction changes.

Although the predetermined connection portion 23e is formed on the belt anchor reinforcement 23 in this embodiment of the invention, the invention is not limited to this configuration. Alternatively, the reinforcing member that connects the front flange portion and the rear flange portion, which constitute the pillar body of the center pillar 20, has a predetermined connection portion that rectilinearly connects the front flange to the rear flange. The predetermined connection portion may be formed on, for example, the outer reinforcement 24.

MODIFIED EXAMPLE OF EMBODIMENT

Figure 11:
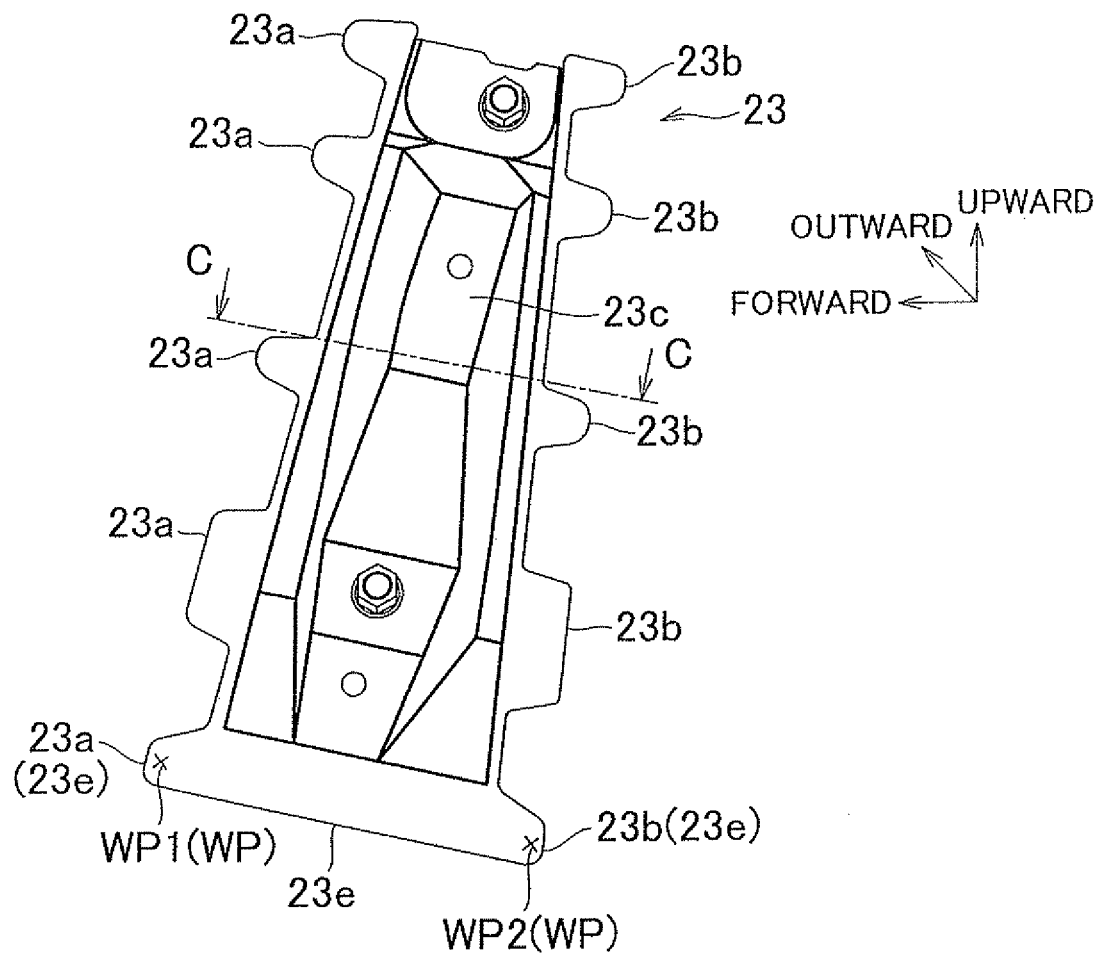
FIG. 11 is composed of a plan view and a cross-sectional view that show a belt anchor reinforcement according to a modification example of the embodiment of the invention.
Figure 11:

The shape of the belt anchor reinforcement 23 is not limited to that described in the above embodiment of the invention (FIG. 6). The belt anchor reinforcement 23 may be formed in a shape as shown in, for example, FIG. 11. FIG. 11 is a plan view and a cross-sectional view that show a belt anchor reinforcement according to a modified example of the embodiment of the invention. The belt anchor reinforcement 23 shown in FIG. 11 has the predetermined connection portion 23e at the lower portion thereof in the same manner as shown in FIG. 6, and achieves an effect similar to that of the belt anchor reinforcement 23 shown in FIG. 6.

As described above, the vehicular center pillar according to the invention enhances proof stress, and is particularly suited for enhancing the proof stress in the vehicle inward tumbling direction.

While the invention his been described with reference to the example embodiment thereof, it is to be understood that the invention is not limited to the described embodiment or constructions. To the contrary, the invention is intended to cover various modifications and equivalent arrangements. In addition, while the various elements of the example embodiment of the invention are shown in various combinations and configurations, other combinations and configurations, including more, less or only a single element, are also within the scope of the invention.

The invention claimed is:

1. A vehicular center pillar that extends in a vertical direction of a vehicle, the vehicular center pillar comprising:
a pillar body that has flanges on front and rear sides thereof in a longitudinal direction of the vehicle respectively;
a reinforcing member including a first mounting hole disposed in an upper portion of the reinforcing member, a second mounting hole disposed in a lower portion of the reinforcing member, a predetermined connection portion that rectilinearly connects the front flange to the rear flange along a virtual straight line that couples the front flange and the rear flange to each other, and a protrusion that protrudes in a vehicle width direction at a position different from the predetermined connection portion in the vertical direction; and a seatbelt anchor attached to the reinforcing member through the first and second mounting holes, wherein the entire predetermined connection portion is disposed above a lower end of a window frame and below the seatbelt anchor in the vertical direction, and the predetermined connection portion is located near the lower end of the window frame.

2. The vehicular center pillar according to claim 1, wherein the reinforcing member fixes the seatbelt anchor thereto at the protrusion.

3. The vehicular center pillar according to claim 1, wherein the reinforcing member is joined to the front flange and the rear flange at a plurality of joint points along the vertical direction respectively, and at least one of the joint points are set at the predetermined connection portion.

4. The vehicular center pillar according to claim 1, wherein the predetermined connection portion is formed at a lower end portion of the reinforcing member.

5. The vehicular center pillar according to claim 1, wherein:

the center pillar includes a hollow portion surrounded by the pillar body; and the predetermined connection portion is formed at a location where a cross-sectional area of the hollow portion of the center pillar that has remained substantially constant along the vertical direction begins to change.

6. The vehicular center pillar according to claim 1, wherein the predetermined connection portion is formed at a location where an inclination of the center pillar in a vehicle width direction changes.

7. The vehicular center pillar according to claim 1, wherein an inner center portion of the pillar body is sandwiched between the seatbelt anchor and the reinforcing member.

8. The vehicular center pillar according to claim 1, further comprising a plurality of predetermined connection portions.

9. A vehicular center pillar that extends in a vertical direction of a vehicle, the vehicular center pillar comprising:

a pillar body that has flanges on front and rear sides thereof in a longitudinal direction of the vehicle respectively;

a reinforcing member comprising:

a first portion including a first mounting hole disposed therein;

a second portion including a protrusion that protrudes in a vehicle width direction and a second mounting hole disposed therein; and a third portion including a predetermined connection portion that rectilinearly connects the front flange to the rear flange along a virtual straight line that couples the front flange and the rear flange to each other; and a seatbelt anchor attached to the reinforcing member through the first and second mounting holes, wherein the entire predetermined connection portion is disposed above a lower end of a window frame in the vertical direction and located near the lower end of the window frame, and wherein the first portion is formed at an upper end of the reinforcing member, the third portion is formed at a lower end of the reinforcing member, and the second portion is formed on the reinforcing member between the first and third portions.

* * * * *